(12) United States Patent
Weinstein

(10) Patent No.: US 6,299,820 B1
(45) Date of Patent: Oct. 9, 2001

(54) PRESSURE VESSEL: OVERMOLDING A POLYOLEFIN ONTO A POLYOLEFIN

(75) Inventor: Martin J. Weinstein, Charlotte, NC (US)

(73) Assignee: Celgard Inc., Charlotte, NC (US)

( * ) Notice: Subject to any disclaimer, the term of this patent is extended or adjusted under 35 U.S.C. 154(b) by 0 days.

(21) Appl. No.: 09/250,116

(22) Filed: Feb. 16, 1999

Related U.S. Application Data

(62) Division of application No. 08/719,668, filed on Sep. 25, 1996, now Pat. No. 5,916,647.

(51) Int. Cl.[7] .................................................. B29C 45/14
(52) U.S. Cl. .......................... 264/513; 264/254; 264/259; 264/271.1
(58) Field of Search .................................... 264/254, 259, 264/271.1, 296, 533, 537, 320, 322, 512, 513

(56) References Cited

U.S. PATENT DOCUMENTS

| | | | |
|---|---|---|---|
| 4,149,645 | * | 4/1979 | Valyi .................................... 215/12.2 |
| 4,316,870 | * | 2/1982 | Rowley ................................. 264/296 |
| 5,264,171 | | 11/1993 | Pasad et al. .......................... 264/103 |
| 5,352,361 | | 10/1994 | Prasad et al. .................... 210/321.81 |
| 5,409,655 | | 4/1995 | Crockett ................................. 264/266 |
| 5,582,238 | * | 12/1996 | Plaschkes ............................... 165/56 |
| 5,894,041 | * | 4/1999 | Cornell .................................. 264/512 |
| 5,916,647 | * | 6/1999 | Weinstein ............................. 428/36.9 |

FOREIGN PATENT DOCUMENTS

| | | |
|---|---|---|
| 0689928 A2 | 1/1996 | (DE) . |
| 2440824 A1 | 6/1980 | (FR) . |
| 2550848 | 2/1985 | (FR) . |
| 58-028320 A | 2/1983 | (JP) . |
| 7-112029 A | 5/1995 | (JP) . |

OTHER PUBLICATIONS

"LIQUI–CEL® Extra–Flow 4"×28" Membrane Contractor For Process Scale" 1994 Product Bulletin.

Rohner, M.L. "Injection Weldable Nylons" Society of Plastics Engineers, Inc. Rochester, NY, Sep. 15–16, 1993.

* cited by examiner

Primary Examiner—Rena L. Dye
(74) Attorney, Agent, or Firm—Robert H. Hammer, III

(57) ABSTRACT

A pressure vessel includes a polyolefin extruded tube, a polyolefin flange overmolded onto the tube, and a cap engaged to the flange. In the overmolding process, a polyolefin material is overmolded unto a polyolefin substrate.

10 Claims, 2 Drawing Sheets

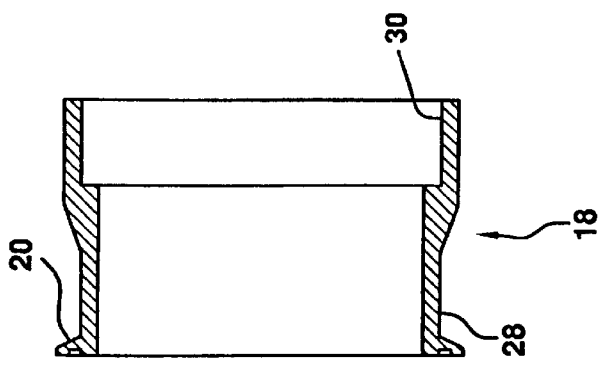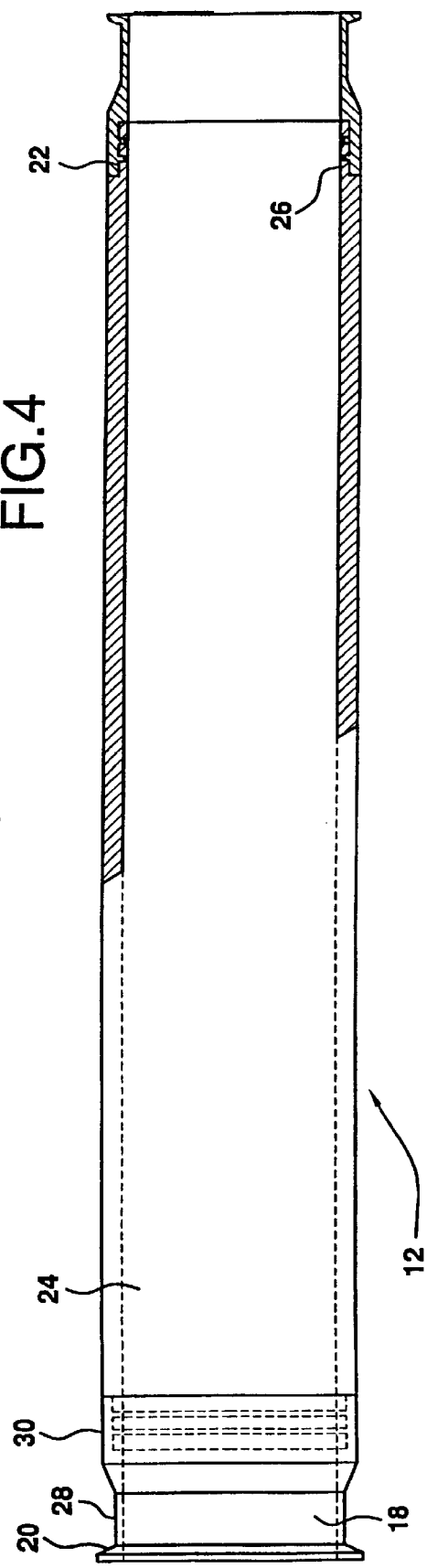

PRESSURE VESSEL: OVERMOLDING A POLYOLEFIN ONTO A POLYOLEFIN

This application is a divisional of application U.S. Ser. No. 08/719,668 filed Sep. 25, 1996, now U.S. Pat. No. 5,916,647.

FIELD OF THE INVENTION

The instant invention is directed to a method of making a pressure vessel using an overmolding process in which a polyolefin is overmolded onto a polyolefin; and the pressure vessel made thereby.

BACKGROUND OF THE INVENTION

Pressure vessels made with polyolefin housings are known. See: "LIQUI-CEL® Extra-Flow 4"×28" Membrane Contactor For Process Scale" 1994 Product Bulletin. The housings of these vessels, however, must be machined to create the flanges to which the end caps are secured. Machining of the housings is expensive. A less expensive method for the production of the housings is necessary.

The overmolding process is known. See: U.S. Pat. No. 5,409,655; French Patent No. 2,550,848; and Rohner, M. L. "Injection Weldable Nylons" Society of Plastics Engineers, Inc. Rochester, N.Y., Sep. 15–16, 1993. Typically, in an overmolding process, an elastomer is overmolded onto a substrate (the substrate may be made of metal or rigid plastic). In U.S. Pat. No. 5,409,655, KRAYTON®, a thermoplastic elastomer sold by Shell Oil Company of Houston, Tex., is overmolded onto NORYL®, a modified nylon material sold by General Electric Company of Fairfield, Conn. In French Patent No. 2,550,848, a thermoplastic elastomer (an elastomer based on polypropylene and an ethylene-propylene copolymer) is overmolded onto a polypropylene. In the Rohner article, injection welding grade nylons are overmolded onto nylons.

It is believed by some in the plastic's industry that overmolding of a polyolefin (i.e., the overmolded material) onto a polyolefin (i.e., the substrate or also referred to as an insert) is not possible because a melt interface between the two parts can not be formed without overheating and thereby distorting (e.g., warping or caving in) the substrate. Accordingly, there is a need for a process by which a polyolefin can be overmolded onto a polyolefin substrate.

SUMMARY OF THE INVENTION

A method for overmolding a polyolefin onto a polyolefin substrate and for making a pressure vessel includes the steps of:

providing a polyolefin substrate;

placing the substrate into a mold;

supporting the substrate to prevent distortion;

injecting an unfilled polyolefin into a mold and over a surface of the substrate; and releasing an overmolded part from the mold.

A pressure vessel includes: a polyolefin extruded tube; a polyolefin flange overmolded onto said tube; and a cap engaged to said flange.

BRIEF DESCRIPTION OF THE DRAWINGS

For the purpose of illustrating the invention, there is shown in the drawings a form which is presently preferred; it being understood, however, that this invention is not limited to the precise arrangements and instrumentalities shown.

FIG. 3 is a cross sectional view of the overmolded section that forms a part of the housing of the vessel.

FIG. 4 is a plan view of the housing with parts broken away.

DETAILED DESCRIPTION OF THE INVENTION

Figure 1:
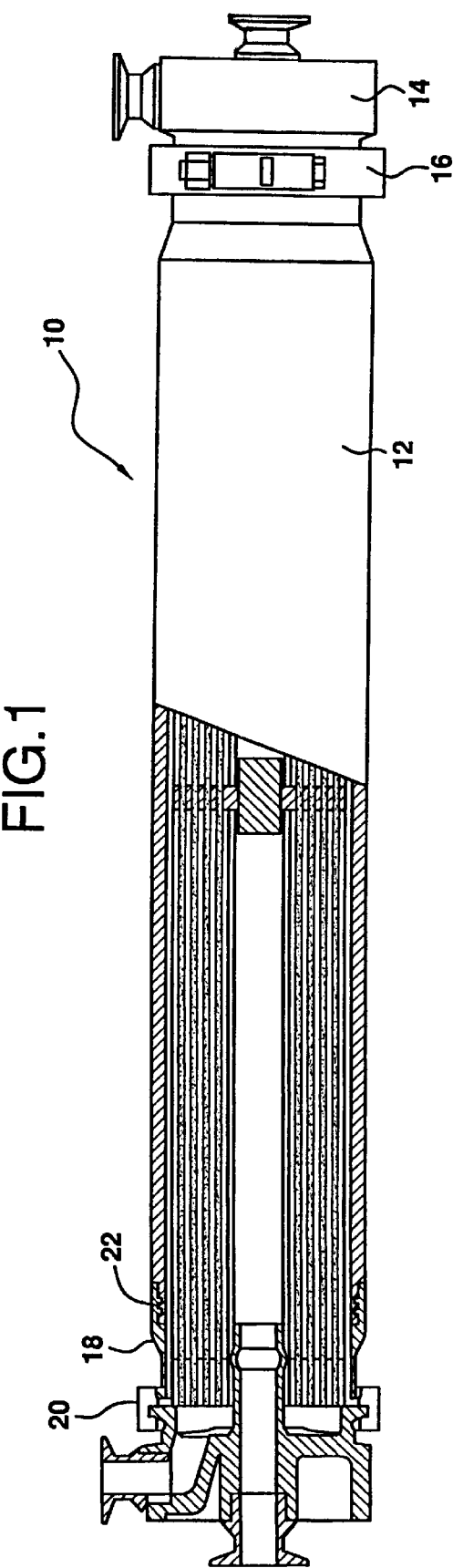
FIG. 1 is a plan view of a pressure vessel with parts broken away.

Referring to the drawings, wherein like numerals indicate like elements, a pressure vessel 10 is shown in FIG. 1. Pressure vessel 10 includes a housing 12, an end cap 14, and a clamp 16. Housing 12 comprises an overmolded section 18 having a flange 20, and an extruded tube 24.

Pressure vessel 10 (i.e. housing 12 and preferably cap 14) is made from a polyolefin material. Clamp 16 may be made of a metal or plastic material. Overmolded section 18 is welded to extruded tube 24 along a weld line 22. Welding of the overmolded section 18 to extruded tube 24 is accomplished by an overmolding process (described herein below).

Pressure vessel, as used herein, refers to an enclosure capable of withstanding pressures up to 120 psi gauge. These pressure vessels may be used in hollow fiber membrane contactors disclosed in U.S. Pat. Nos. 5,264,171 and 5,352,361, which are incorporated herein by reference. Polyolefin, as used herein, refers to a class or group name for thermoplastic polymers derived from simple olefins; these polyolefins-specifically exclude elastomers. The polyolefins will be discussed in greater detail below.

Figure 2:
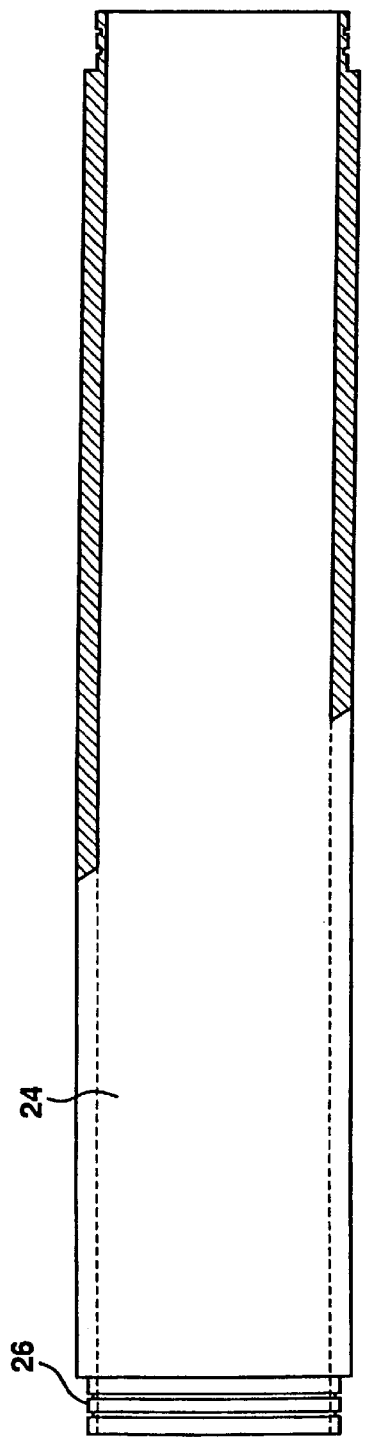
FIG. 2 is a plan view of the extruded tube from which the housing of the vessel is formed with parts broken away.

Referring to FIG. 2, the housing 12 is shown. Housing 12 is formed, in part, from an extruded tube 24. Each end of extruded tube 24 has a machined section 26. Machined section 26 is formed with a surface that facilitates a weld line formation between machined section 26 and overmolded section 18. Machined section 26 is preferably formed by cutting, as on a lathe, but could be molded instead. The extruded tube 24 is made from an unfilled, (or neat) polyolefin material. Unfilled, as used herein, refers to the lack of or the substantial lack of a material that acts as a mold release agent or a polymer flow agent or an internal polymer lubricant. The polyolefin material may be either an extrusion grade or injection moldable grade polymer, but preferably is extrusion grade polymer. The polyolefin material should have a melt flow index (ASTM D1238) of less than 5 and a specific gravity (ASTM D792A-2) of about 0.8 or greater (the specific gravity being indicative of the materials strength). Preferably, the polyolefin material has a melt-flow index of less than 1 and a specific gravity of about 0.9 or greater. The polyolefin material may be any thermoplastic polymer, e.g. polypropylene, and maybe either a homopolymer or a copolymer. Suitable polyolefin materials include PRO-FAX 6523 or 7823 polypropylene resins available from Montell USA of Wilmington, Del.

Referring to FIG. 3, overmolded section 18 is illustrated. Overmolded section 18 comprises a flange 20, a neck section 28, and a female mating section 30. Female mating section 30 is adapted for hermatically sealing engagement (e.g. welding) with machined section 26 of extruded tube 24 via weld line 22. Overmolded section 18 is formed in a mold during the overmolding process. The mold is discussed in greater detail below. Overmolded section 18 is made from an unfilled (or neat) polyolefin material. Unfilled, as used herein, refers to the lack of or the substantial lack of a material that acts as a mold release agent or a polymer flow agent or an internal polymer lubricant. The polyolefin material may be either an extrusion grade or injection moldable grade polymer, but preferably is an extrusion grade polymer. The polyolefin material should have a melt flow index (ASTM D1238) of less than 5 and a specific gravity (ASTM D792A-2) of about 0.8 or greater (the specific gravity being indicative of the materials strength). Preferably, the polyolefin material has a melt flow index of less than 1 and a specific gravity of about 0.9 or greater. The polyolefin material may be any thermoplastic polymer, e.g. polypropylene, and maybe either a homopolymer or a copolymer. Suitable polyolefin materials include PRO-FAX 6523 or 7823 polypropylene resins available from Montell USA of Wilmington, Del.

Referring to FIG. 4, overmolded section 18 is shown in engagement with extruded tube 24 via weld line 22.

In manufacture, extruded tube 24 is, preferably, machined to form machined sections 26. The machined extruded tube 24 is inserted into a mold. The mold (not shown) is adapted to receive the machined section 26 of the extruded tube 24 and support the internal surface thereof. The mold is also adapted to form the overmolded section 18 via an injection technique. The fabrication of this multi-parted mold is within the skill of the art. With the multi-parted mold in place, a polyolefin material is injected, at the resin's suggested use temperature, into the mold, and the overmolded section 18 is formed thereby. At the same time, the overmolded section 18 is welded to the machined section 26 of the extruded tube 24. Thereafter, the housing 12 (i.e. tube 24 with integrally form overmolded section 18) is released from the mold.

The present invention may be embodied in other specific forms without departing from the spirit or essential attributes thereof and, accordingly, reference should be made to the appended claims, rather than to the foregoing specification, as indicating the scope of their invention.

I claim:

1. A method of making a pressure vessel by overmolding a polyolefin onto a polyolefin substrate comprising the steps of:

providing a polyolefin substrate, said substrate being a tube capable of withstanding pressures greater than one pound per square inch;

placing the substrate into a mold;

supporting the substrate to prevent distortion;

injecting a unfilled polyolefin into the mold and over a surface of the substrate to form an over molded flanged section;

releasing an overmolded part from the mold; and capping the open ends of the tube thereby forming a pressure vessel.

2. The method according to claim 1 wherein said substrate being made from an unfilled polyolefin.

3. The method according to claim 1 wherein said polyolefin being a polypropylene.

4. The method according to claim 1 wherein said polyolefin having a melt-flow index of less than 5 and a specific gravity of about 0.8 or greater.

5. The method according to claim 4 wherein said polyolefin having a melt-flow index of less than 1 and a specific gravity of about 0.9 or greater.

6. A method for overmolding a polyolefin onto a polyolefin substrate comprising the steps of:

providing a polyolefin substrate, said substrate being a tube capable of withstanding pressures greater than one pound per square inch;

placing the substrate into a mold;

supporting the substrate to prevent distortion;

injecting a unfilled polyolefin into the mold and over a surface of the substrate to form an over molded flanged section;

releasing an overmolded part from the mold; and capping the open ends of the tube.

7. The method according to claim 6 wherein said substrate being made from an unfilled polyolefin.

8. The method according to claim 6 wherein said polyolefin being a polypropylene.

9. The method according to claim 1 wherein said polyolefin having a melt-flow index of less than 5 and a specific gravity of about 0.8 or greater.

10. The method according to claim 9 wherein said polyolefin having a melt-flow index of less than 1 and a specific gravity of about 0.9 or greater.

* * * * *